Feb. 4, 1964 J. GOGAN 3,120,306
METHOD AND APPARATUS FOR TREATING SPRINGS
Filed July 31, 1961 9 Sheets-Sheet 1

FIG.1

INVENTOR.
JOSEPH GOGAN
BY Williams, David,
Hoffmann & Jount
ATTORNEYS

Feb. 4, 1964 J. GOGAN 3,120,306
METHOD AND APPARATUS FOR TREATING SPRINGS
Filed July 31, 1961 9 Sheets-Sheet 2

FIG.2

INVENTOR.
JOSEPH GOGAN
BY Williams, David,
Hoffmann & Yount
ATTORNEYS

FIG. 3b

INVENTOR.
JOSEPH GOGAN
ATTORNEYS

INVENTOR.
JOSEPH GOGAN
BY Williams, David,
Hoffmann & Yount
ATTORNEYS

Feb. 4, 1964  J. GOGAN  3,120,306
METHOD AND APPARATUS FOR TREATING SPRINGS
Filed July 31, 1961  9 Sheets-Sheet 8

INVENTOR.
JOSEPH GOGAN
ATTORNEYS

Feb. 4, 1964 J. GOGAN 3,120,306
METHOD AND APPARATUS FOR TREATING SPRINGS
Filed July 31, 1961 9 Sheets-Sheet 9

FIG.14

INVENTOR.
JOSEPH GOGAN
BY Williams, David,
Hoffmann & Jount
ATTORNEYS

United States Patent Office 3,120,306
Patented Feb. 4, 1964

3,120,306
METHOD AND APPARATUS FOR TREATING SPRINGS
Joseph Gogan, Wisner Road, R.D. 2, Willoughby, Ohio
Filed July 31, 1961, Ser. No. 128,258
10 Claims. (Cl. 209—79)

This invention relates to methods and machines for treating coil springs, and, more particularly, to those methods and machines for treating coil springs which include provision for compressing the springs beyond their yield point and thus presetting or causing a permanent change in the yield point of the springs.

While this invention can be used for presetting coil springs designed for various uses, it is especially useful for presetting coil springs intended to be used in vehicles for load suspension purposes. Such presetting of coil springs for vehicle suspension use is desirable for it provides a longer life for the springs by extending the yield point of the springs.

A principal object of the present invention is the provision of a new and improved method and machine of the above noted type, which includes provision for performing numerous selected operations on the springs with a minimum of manual handling of the springs.

Another principal object of the present invention is the provision of a new and improved machine, of the above noted type, wherein the machine components are properly controlled to provide a desired sequence of operations and a rapid and automatic processing of the springs.

Another principal object of the present invention is the provision of a new and improved machine for treating coil springs having means for moving the springs from station to station and at consecutive stations, means for presetting the springs, means for load testing the preset springs, and means for discharging the springs at different points depending upon the grade of the spring as determined by the testing mechanism.

Another object of the present invention is the provision of a machine, of the last noted type, wherein the discharging means is automatically controlled by the testing mechanism.

Still another object of the present invention is the provision of a machine of the last noted type, wherein each spring is marked to identify its grade.

Further objects and advantages of this invention will be apparent from the following detailed description and accompanying drawings forming a part of this specification, in which:

FIG. 4 is a vertical sectional view with parts broken away of the spring treating machine shown in FIGS. 2 and 3a taken approximately on the section line 4—4 on FIG. 2 and FIG. 3a;

FIG. 5 is a vertical sectional view with parts broken away of the machine shown in FIG. 4 taken approximately on the line 5—5 of FIG. 4;

FIG. 6 is a vertical sectional view of the spring treating machine shown in FIGS. 2 and 3a taken approximately along the line 6—6 of FIG. 2 and FIG. 3a;

FIG. 8 is a vertical sectional view of the spring treating machine shown in FIGS. 2 and 3a taken approximately along the section line 8—8 on FIG. 2 and FIG. 3a;

FIG. 9 is a vertical sectional view taken approximately along the line 9—9 of FIG. 8;

FIG. 11 is a view of the spring treating machine shown in FIGS. 2 and 3a taken approximately along the line 10—10 on FIG. 2 and FIG. 3a;

General Description

The present invention is preferably embodied in a machine for treating coil springs which comprises a frame 10, a conveyor 11 mounted in the frame 10 for moving springs through a number of work stations, means 12 adjacent the conveyor 11 for aligning the springs while they are on the conveyor 11, a plurality of spring presetting mechanisms 13 for compressing the springs beyond their yield point, a testing device 14 which tests each of the preset springs to determine its resistance to compression, a discharge mechanism 15 which discharges the springs according to grade as determined by the testing mechanism, and a marking mechanism 16 for marking each spring as it is discharged from the machine. All of these mechanisms are suitably timed and powered by fluid and/or electrical energy. The fluid power for operating the various mechanisms is supplied by fluid supply unit 20 and the electrical power is supplied by the common factory outlets and manually controlled from push button control boxes 21 and 22.

The operation of the machine of the present invention is begun by manually placing a spring on the conveyor 11. The conveyor then moves the spring to the aligning mechanism 12. The aligning mechanism 12 rotates the spring so that it will be properly positioned when the preset mechanisms 13 engage the spring. After the aligning operation the conveyor moves the spring to the first of the plurality of preset mechanisms 13. There are three such preset mechanisms shown located side-by-side adjacent the conveyor 11 at each of which the spring is compressed beyond its yield point. This presetting of a spring intended for vehicle load suspension purposes, is recognized by persons skilled in the art, as enabling the spring to serve to better advantage. When the compression of the spring is entirely within the yield point thereof, upon removal of the compressing force the spring will return to its normal state. However, when the spring is subjected to a compressive force which compresses the spring beyond its yield point, removal of the compressive force results in a spring which has been permanently set and which has an increased yield point.

After the three presetting operations the spring is conveyed by the conveyor 11 to the testing mechanism 14. The testing mechanism determines the spring's resistance to compression and records this determination, as will be fully described hereinbelow. The spring is then conveyed to the discharge mechanism and removed from the conveyor 11 at one of the four discharge stations, depending upon the grade of the spring as determined by the testing mechanism. As the springs are moved from the conveyor 11 by the discharge mechanism and into the discharge chutes 18, marking mechanism 16, located between the conveyor 11 and the discharge chutes 18, causes each spring to be marked in accordance with the grade of the spring. The spring then slides down the proper discharge chute 18, and the discharge chutes 18 guide the springs into any suitable receptacle of receiving mechanism so that the spring may be easily removed from the area in which the spring treating machine is located.

*Frame Structure*

The frame 10 which supports the various mechanisms of the machine includes a main frame 30, an intermediate frame 31, and a conveyor support frame 32. Leveling means, such as adjustable legs 33, at each of the corners of the main frame 30, is provided for leveling the machine.

The main frame 30 comprises main frame side sections 40 and 41, respectively, which are positioned on opposite sides of the conveyor 11 and which extend parallel to the conveyor 11. Main frame end sections 42 and 43 extend transversely of the main frame side sections 40 and 41 and connect the main frame side sections 40 and 41 to each other. A plurality of beams 45 are suitably secured as by bolt and plate arrangements 46, to the main frame 30 and extend between the main frame sections 40 and 41. Each of the beams 45 supports either one of the plurality of preset mechanisms 13, the testing mechanism 14, or the aligning mechanism 12. Also mounted on the main frame 30 is the discharge mechanism 15.

The intermediate frame 31 includes side frame members 47 which are connected by end frame member 48, and it is supported by the main frame 30 and is vertically movable with respect thereto. This vertical movement is accomplished by adjusting bolts 49 which are threadedly engaged in the intermediate frame end members 48 and bear against portions of the main frame 30. By turning the bolts 49 it can be seen that the intermediate frame 31 would be moved vertically with respect to the main frame 30. Vertically extending rods 49' secured to the main frame guide this vertical movement. The intermediate frame 31 supports the marking mechanism 16, discharge chutes 18 and the conveyor frame 32. Thus, these mechanisms will be raised when the intermediate frame is raised.

The conveyor frame 32 is secured on one end to the intermediate frame end member 48 and at the other end to a support member 50 which extends between side frame members 47. Any suitable means may be used to secure the conveyor frame 32 to the intermediate frame 31, and it is shown bolted to the intermediate frame 31 by bolts 52, which extend through projections 53 welded to the opposite end sections 54 of the conveyor frame 32. The projections 53 of the conveyor frame 32 are provided with a plurality of holes 55 adapted to receive bolt 52 which secures the conveyor frame 32 to the intermediate frame 31. The centers of these holes 55 are spaced approximately two inches apart and provide for horizontal adjustment of the conveyor frame 32 with respect to the intermediate frame 31. Thus it can be seen that by raising the intermediate frame 31 the machine may be adjusted to treat springs having different diameters and by moving the conveyor frame 32 horizontally with respect to the intermediate frame 31 the machine can be adjusted to treat springs of different lengths.

The end members 54 of the conveyor frame 32 are U-shaped with the open ends of the U facing each other. These U-shaped members 54 are secured together by means of beams 60 which extend from the corners of the legs 61 of one of the U-shaped members 54 to the corresponding corners of the legs 61 of the U-shaped member 54 at the other end of the machine. The beams 60 are vertically spaced with respect to each other so that the horizontally extending beams 45 which are secured to the main frame 30 can extend between the beams 60. A plurality of vertically extending support members 64 extend vertically from one beam member 60 to the other beam member 60 and are secured at spaced points to these beam members thereby providing a rigid conveyor frame 32.

*Conveyor*

The conveyor 11 is mounted in the conveyor frame 32, and includes a pair of shafts 70, 71 rotatably mounted in the legs 61 of the U-shaped members 54 at the opposite ends of the conveyor frame 32. A pair of sprockets 72 are mounted on each of the shafts 70 and 71, and the sprockets 72 on the shafts are positioned in alignment. A pair of chains 74 and 75 are trained around the aligned sprockets and tensioning means 76 is provided so that the tension in the chains 74 and 75 can be adjusted. Extending between the chains 74 and 75 and suitably secured to the chains 74 and 75 are a plurality of equally spaced conveyor flights 80 which are adapted to carry a spring through the machine.

Figure 3:
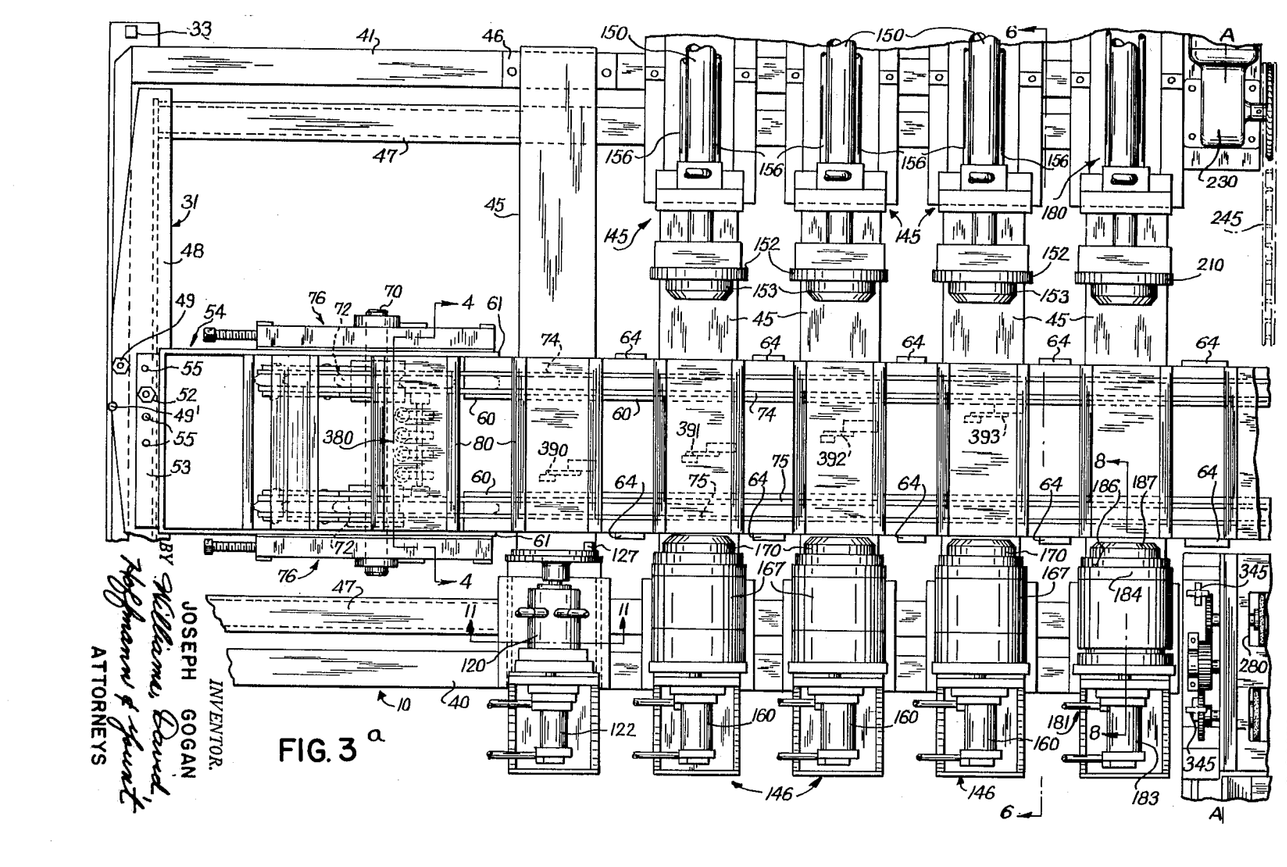
FIGS. 3a and 3b are enlarged partial views of the top of the spring treating machine illustrated in FIG. 2 which when jointed on the lines A—A form an enlarged top view of substantially the entire machine.

The conveyor flights 80, as best seen in FIG. 3, are secured to the chains 74 and 75 by suitable means such as bolts 81 and 82 which extend through brackets 83 and 84, which in turn are secured to the chains 75 and 74, respectively. The bolts 81, 82 extend into the horizontal base portion 86 of the flights 80. Extending vertically from the horizontally extending base portion 86, in a direction away from the chains 74 and 75, are a pair of spaced plate members 87. As best seen in FIG. 3, the ends of the vertically extending plate members 87 remote from the horizontally extending member 86 are inclined so that a spring positioned on the flights 80 will be suitably held thereon.

Secured to and extending beneath the horizontally extending plate member 86 is a rocker mechanism 90. This rocker mechanism 90 includes a plurality of blocks 91 secured by suitable bolts 91' to the plate member 86, a shaft 92 extending through and beyond each of the blocks 91 and rotatably supported by the blocks 91, and a plurality of rocker arms 93 rotatably mounted on the shaft 92 and spaced apart by the spaced blocks 91. The rocker arm assembly 90 also includes a plurality of blocks 95. The blocks 95 are suitably secured to the horizontally extending member 86 by bolts 95' and extend below the member 86 in alignment with the rocker tabs 93. Threadedly secured in each of the blocks 95 is a spring pin device 96. The spring pin device is supported in the blocks 95 by set screws 97 and is provided with a pin 98 normally urged outwardly and adapted to engage one of a pair of detents 99 on the end of the rocker tab 93 adjacent to the block 95. It can now be seen that if the rocker tab 93 is pivoted the pin 98 will extend into the detent 97 adjacent to it and thus hold the rocker tab 93 in the position to which it was pivoted. The purpose of the rocker tab mechanism 93 will be explained fully hereinbelow.

Figure 3B:
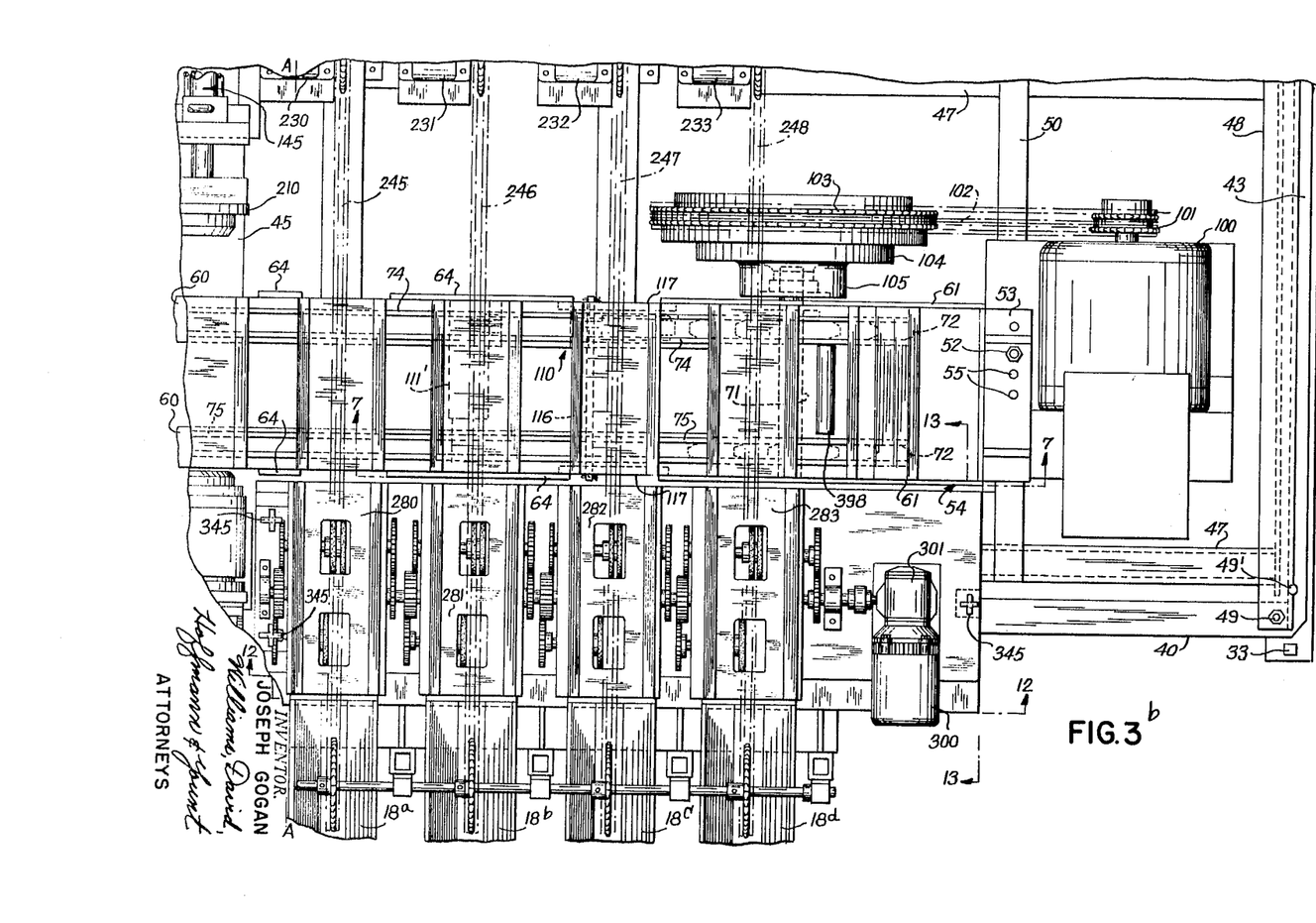

The mechanism for moving the conveyor 11 and the flights 80 is best seen in FIG. 3b of the drawings. This mechanism includes a motor 100, which drives sprockets 101 having chains 102 trained therearound. The chains 102 are also trained around sprockets 103 which are operatively connected to the shaft 71 on which sprockets 72 are mounted by a suitable clutch 104 and brake 105, whch are properly energized and de-energized by the electrical control mechanism of the machine. The energization of the clutch 104 and brake 105 causes the conveyor to move intermittently with a stepping motion through the various stations along the conveyor 11, pausing for a period of time at each of the stations. This drive mechanism is mounted on the conveyor frame 32 and is movable with the conveyor frame 32 when it is adjusted as described hereinabove.

Figure 7:
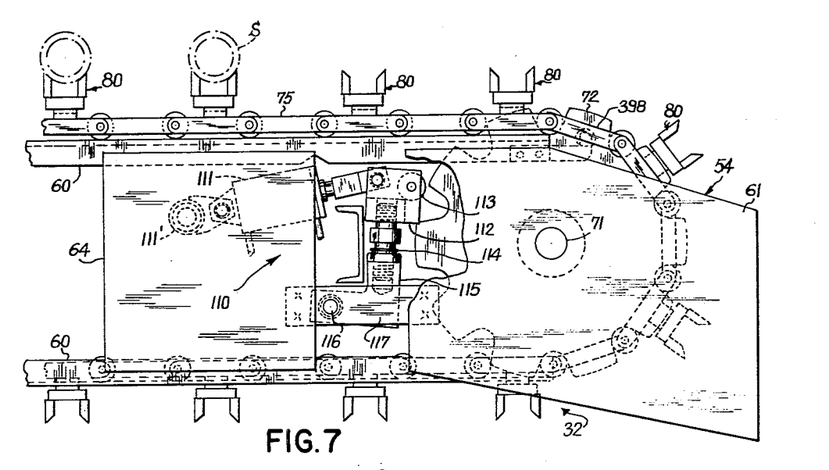
FIG. 7 is a vertical sectional view with parts broken away of the spring treating machine shown in FIGS. 2 and 3b taken approximately along the line 7—7 on FIG. 2 and FIG. 3b.
Figures 8, 9:
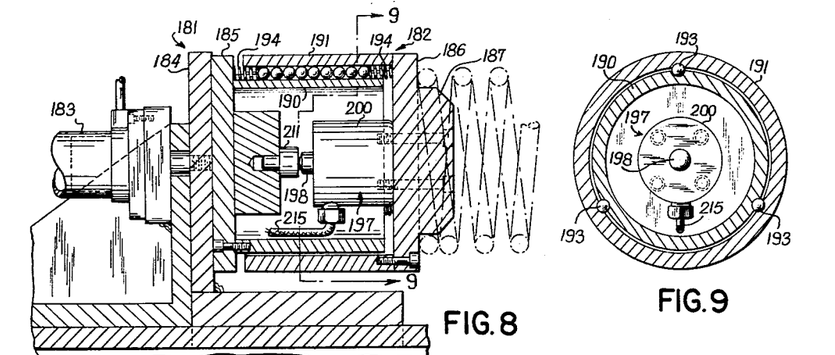

The conveyor 11 must be stopped accurately so that the spring axes are repeatedly positioned on the same line with respect to the various stations. To assist the brake 105 in accurately stopping the conveyor 11 in the proper position, accurate stop mechanism 110 is provided. The accurate stop mechanism 110, best shown in FIG. 7, comprises fluid operated cylinder 111 secured to support rod means 111' which extends between vertically extending support members 64 on opposite sides of the conveyor frame. The cylinder 111 is suitably connected to block means 112 which supports a roller 113. The block 112 is secured by adjusting mechanism 114 to an L-shaped bracket 115 pivotally mounted on rod 116. The rod 116 extends transversely of the conveyor frame between a pair of plates 117 which extend between the legs 61 of end member 54, shown in FIG. 7, and adjacent support member 64 of the conveyor frame. Thus it is apparent that upon actuation of the cylinder 111 the roller 113 will be pivoted about the axis of rod 116. The fluid cylinder 111 is properly actuated in timed relation with the actuation of the brake 105 and the clutch 104 so that the roller 113 will be moved between sprocket teeth on the sprocket 72 which is mounted on the shaft 71 to positively block movement of the sprocket wheel 72 and thereby prevent any improper excessive movement of the conveyor chains 74, 75.

Aligning Mechanism

The conveyor 11 first moves the springs into position where the aligning mechanism 12 can act upon them to position the springs. The aligning mechanism 12 is provided solely to align springs having one end open, i.e. where the last coil does not engage the next to the last coil. The springs used in automobile chassis which are squared or closed at each end do not require positioning. Thus the aligning mechanism is operated only when springs having an open end are being treated.

Figures 6, 11:
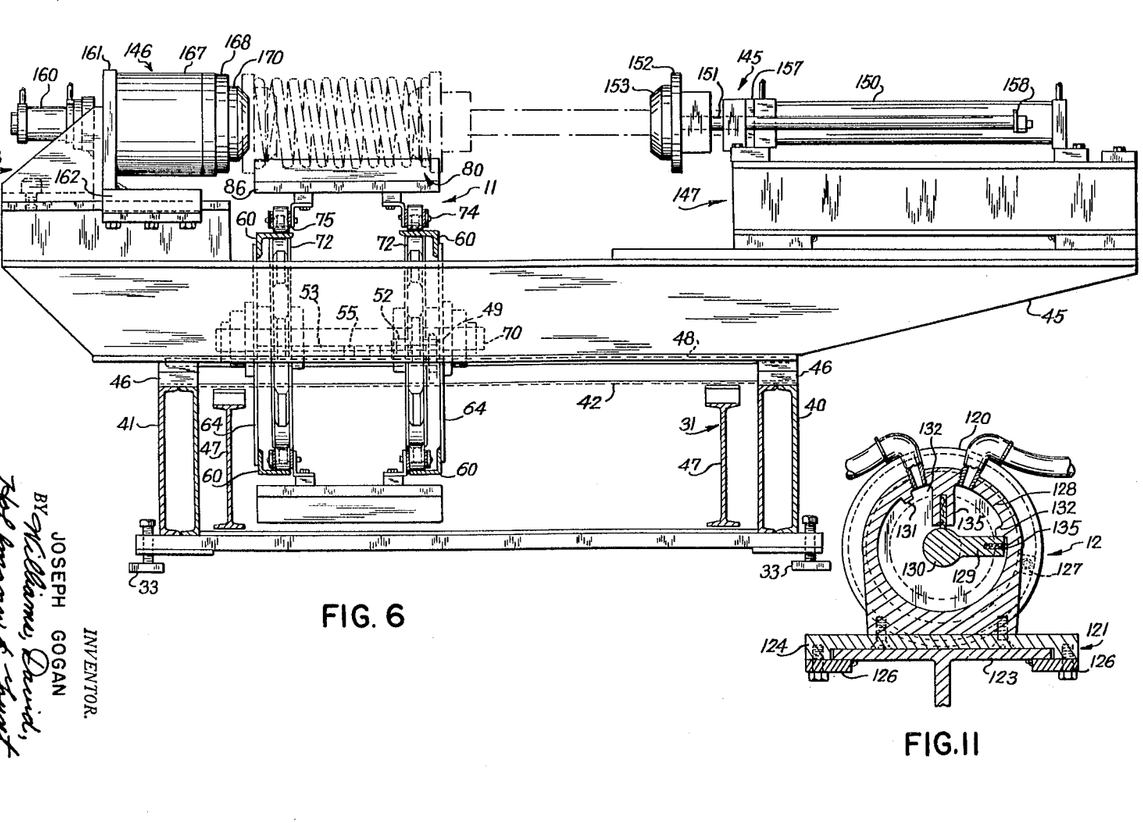

The aligning mechanism 12, shown in FIG. 11, consists of a cylinder 120, suitably mounted on a slide mechanism 121 so that the hydraulic cylinder 122 can move the cylinder 120 transversely of the direction of the feed of the springs. The slide mechanism 121 consists of a T-shaped beam 123 secured to the transversely extending support member 45 which supports the aligning mechanism. The cross of the T-shaped beam 123 provides a guideway on which the horizontally extending member 124 which is secured to the support plate 125 for the cylinder 120 can slide. Plates 126 are secured to the member 124 and spaced therefrom to provide a slideway for the receipt of the cross of the T-shaped beam 123. The movement of the cylinder 120 causes a lug 127 extending from the forward portion of the cylinder 120 to be positioned in the plane in which the end of an open ended spring is positioned. The lug 127 is then rotated by the application of hydraulic fluid to the chamber 128 causing the blade 129 to rotate the shaft 130 on which lug 127 is mounted. Rotation of the lug 127 causes the lug to engage the end of the spring and rotate the spring until rotation of the lug is stopped by the blade 129 contacting stop 131. Fluid is then applied to the chamber 132 to cause the blade 129 to return to its original position resting against the stop 133. Suitable hydraulic seals 135 are utilized between the shaft 130 and blade 129 and the walls of the cylinder 120 to prevent the flow of hydraulic fluid out of the desired chamber. Thus, when the spring is moved to the presetting mechanisms 13 it is properly aligned so that the presetting mechanisms can properly operate upon it.

Preset Mechanism

There are three preset mechanism designated 140, 141 and 142. The preset mechanisms are identical, each including a means 145 to compress the springs and a reaction member 146 against which the springs are compressed. The compressing means 145 is mounted on one end of a transversely extending beam 45 by any suitable mechanism designated 147. The reaction member 146 is suitably mounted by mounting means 148 on the opposite side of the transversely extending beam 45.

Figures 4, 5:
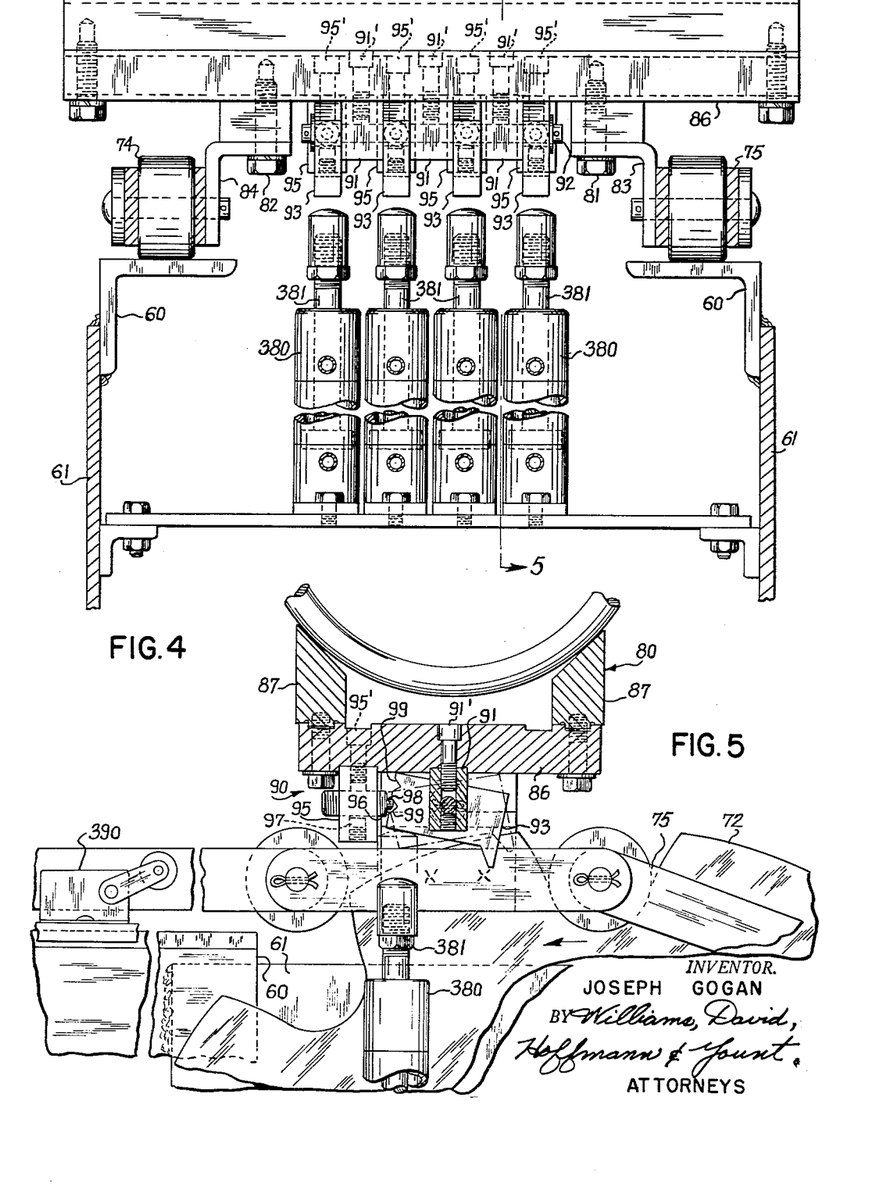
Figure 10:
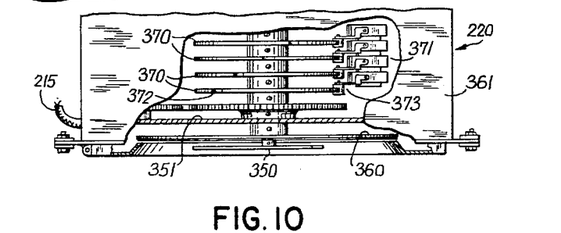
FIG. 10 is a top elevational view with parts broken away of a portion of the control mechanism utilized in the spring treating machine of FIG. 1.

The means 145 for compressing the springs includes a hydraulic cylinder 150, shown in FIG. 5, which is suitably supplied with fluid from the fluid control unit 20 to move the piston rod 151 towards and away from the conveyor 11 carrying the springs. Suitably secured to the end of the piston rod 151 adjacent the conveyor 11 is a compression plate 152, and a special centering pilot 153 is welded to the face of the compression plate 152. The centering pilot 153 is provided with a conical surface, the axis of which is approximately parallel to the axes of the springs being treated by the machine, the smallest diameter thereof being smaller than the inner diameter of the springs and the largest diameter thereof being substantially the same size as the inner diameter of the springs. A pair of rods 156 are mounted so that one is located on each side of each of the cylinders 150. The pair of rods 156 are secured to and movable with the adjacent compression plate 152, and are guided in their movement by fixed plates 157, which slidably support the rods 156. Mounted on the end of each rod 156 is a stop member 158, shown in FIG. 10, which moves with rod 156 and compression plate 152 when cylinder 150 is actuated and engages plate 157 and thereby prevents further movement of the compression plate 152. Thus each spring is compressed to the same degree.

The reaction member 146 preferably includes a double acting fluid cylinder 160 suitably supplied with fluid from the fluid supply unit 20. The cylinder 160 is operatively connected to the vertically extending plate 161. A slide plate 162, similar to the slide plate 124 discussed above in connection with the aligning mechanism 12, is welded to the plate member 161 and cooperates with the T-shaped beam 163 which is welded to the transversely extending support 45 in the same manner as discussed above with respect to the slide mounting 121 of the aligning mechanism. Also welded to the plate 161 is the drum 167, the side of which adjacent the conveyor 11 carries the compression plate 168. Suitably secured to the compression plate 168 is a special centering pilot 170 which is identical to the centering pilot 153 on the compression means 145.

The operation of the preset mechanism at each of the preset stations 140, 141 and 142 should be apparent from the preceding description of the structure located at these stations. When the conveyor 11 indexes springs to the preset stations the fluid supply unit 20 causes fluid to be directed into the cylinders 150 and 160 of each of the preset mechanisms. This causes the compression plates 168 and 152 to move, towards each other and the pilots 153 and 170 to engage the springs and by the action of the inclined surfaces raise the spring slightly above the flights 80 on the conveyor means 11 which carry the springs. This raising of the spring from the conveyor flights 80 eliminates any friction which would otherwise be present along the diameter of the spring while it is being compressed. After the spring has been compressed the compression plates 152 and 168 are withdrawn from the spring and the spring is thereby lowered back onto the flight 80 of the conveyor 11 so that the spring may be moved to the next station.

Since a spring normally receives three preset operations to properly extend the yield point of the spring, as discussed above, after the spring has been compressed at the presetting station 140 the spring is compressed at the presetting stations 141 and 142. Since the preset mechanisms 140, 141 and 142 are supplied with fluid simultaneously three springs are compressed at the same time. Thus, a spring at the presetting station 140 is compressed a first time while a spring at the presetting station 141 is compressed a second time, and while a spring at presetting station 142 is compressed a third time. However, it should be noted that it may be desirable to compress certain springs one or two times rather than three. In such an event certain preset mechanisms can be rendered inoperative in any conventional manner.

Testing Mechanism

The springs after being compressed at the presetting station 142 are moved to the testing station 14 where each spring is tested to determine its resistance to compression. The testing mechanism includes a compressing means 180, which is similar to the compressing means 145 which are located at the presetting stations, and a reaction means 181 which is mounted in a manner similar to the mounting of reaction means 146 located at the presetting stations. The reaction member 181 includes sensing mechanism 182 which senses the resistance of each spring to compression.

The reaction member 181 comprises a double acting fluid cylinder 183 and a plate 184 suitably secured to the piston of the cylinder 183. The sensing mechanism 182 is supported by a plate 185 which is secured to the plate 184. A compression plate 186 having a centering pilot 187 mounted thereon, similar to the centering pilots 153 and 170, is supported by the plate 185 and is movable into engagement with a spring, as discussed above with respect to the presetting stations, upon actuation of the cylinder 183.

The sensing mechanism 182 includes a cylindrical inner shell 190 welded to the plate 185 and a cylindrical outer shell 191 secured to the compression plate 186. Interposed between these shells is a plurality of bearings 193 suitably positioned with respect to the ends of the shell members by means of springs 194, which engage the bearings 193 and the adjacent plate 185 or 186. A conventional load cell 197 is suitably secured to the compression plate 186. The load cell is of the conventional type having a stem 198 which is suitably movable with respect to a hermetically sealed container 200. The load cell is connected to a source of electrical energy and the movement causes a change in the resistance of the circuit and thus causes a change in current flow proportional to the amount of movement of the stem 198. It is to be understood that many other conventional types of measuring cells could be used, for example a suitable hydraulic cell.

When a spring is compressed between the compression plate 186 of the reaction member 181 and the compression plate 210, shown in FIG. 3b of the compressing means 180, the compression plate 186 will be caused to slide relative to the plate 185 on the bearings 193. This relative movement will also cause the hermetically sealed can 200 to move with respect to the stem 198 which bears against bearing means 211 and is thus restrained from moving. This relative movement causes a change in current flow through the load cell 197 proportional to the deflection of the stem 198. This current flows through the conductor 215 to the control mechanism 220, shown in FIG. 10 and described in detail hereinbelow.

*Discharge Mechanism*

Figure 1:
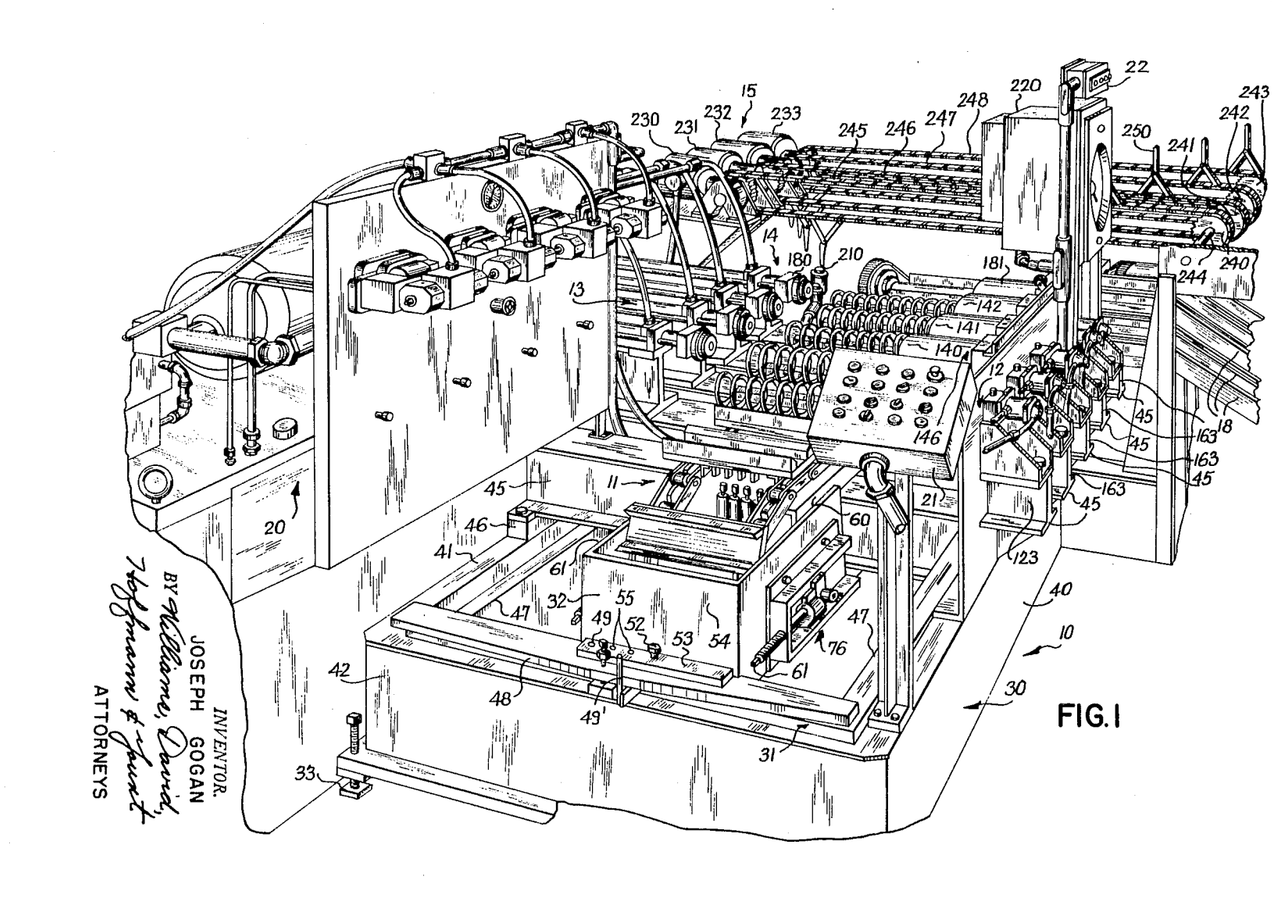
FIG. 1 is a perspective view illustrating the top, front, and side of a spring treating machine embodying the present invention.
Figure 2:
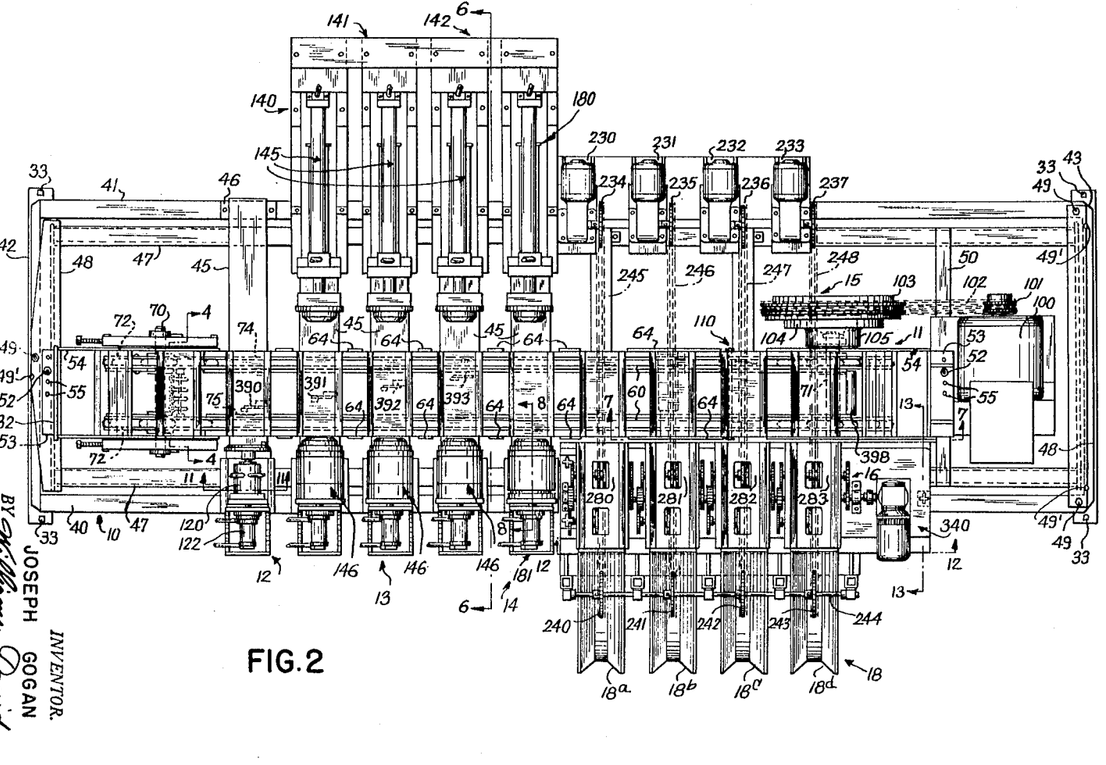
FIG. 2 is a top elevational view of the spring treating machine illustrated in FIG. 1.

The springs, after having been tested by testing mechanism 14, are moved to the discharge mechanism 15. The discharge mechanism 15, shown in FIGS. 1 and 2, includes a plurality of motors 230, 231, 232 and 233. Each of the motors 230—233 is spaced from the adjacent motor a distance equal to the spacing between the centers of the flights 80 on the conveyor 11. Each of the motors drives a sprocket wheel 234—237, respectively, associated therewith. A plurality of sprocket wheels 240—243 are mounted on a shaft 244 in alignment with the sprocket wheels 234—237, respectively. Chains 245, 246, 247 and 248 are trained around the sprocket wheels 234—237 and the associated sprocket wheels 240—243 aligned therewith. Each of these chains has a plurality of flights 250 mounted thereon. These flights 250 are moved by the chains to engage the ends of the springs which are resting in the flights 80 of the conveyor 11. The flights 250 move the springs from the conveyor flights 80.

The motors 230—233 are selectively energized to drive the chains 245 to 248 in a manner to discharge springs of like grade as determined by the testing mechanism into the same discharge chute 18. More specifically, and by way of example, the motor 230 will be energized to discharge the springs of one grade into the first discharge chute 18a. The motor 231 will be energized to discharge all springs of a second grade into discharge chute 18b. Discharge motor 232 will be energized to discharge all springs of a third grade into discharge chute 18c. Finally, discharge motor 233 will be energized to cause all springs of a fourth grade to be discharged into discharge chute 18d. The energization of these motors to perform this sorting function will be more fully explained hereinbelow, and while four motors are shown it is to be understood that any number of motors can be utilized, dictated by the desired number of grades of springs that it is desired to separately discharge.

*Marking Mechanism*

As the springs are moved by the chains 245—248 towards the discharge chutes 18 the springs are moved through the marking mechanism 16. The marking mechanism 16 includes a plurality of marking means 280—283, equal in number to the number of discharge chutes. Each marking means 280—283 is positioned in alignment with one of the discharge chutes and a flight 80 of the conveyor 11 when the conveyor is stopped.

Each of the marking means includes a chute section 284 having a pair of apertures 285 and 286 in the horizontally extending base 287 of the chute section. A pair of spaced, vertically extending plates 288 extend from the horizontally extending base 287 and have inclined surfaces which engage and guide the springs. These plates 288 can be adjusted on the base 287 so that the spacing between the plates can be varied to accommodate different diameter springs. Paint rollers 290 and 291 extend through the aperture 286 and paint roller 292 extends through the aperture 285 to engage the lower portion of a spring moving through the chute section 284.

Figure 13:
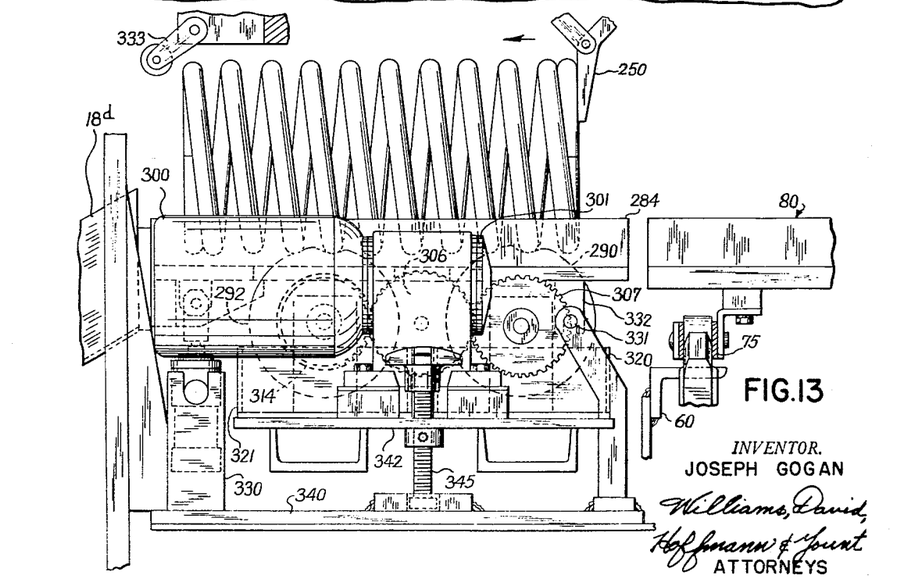
FIG. 13 is a view with parts broken away of the spring treating machine of FIGS. 2 and 3b taken approximately along the line 13—13 on FIG. 2 and FIG. 3b.
Figure 14:
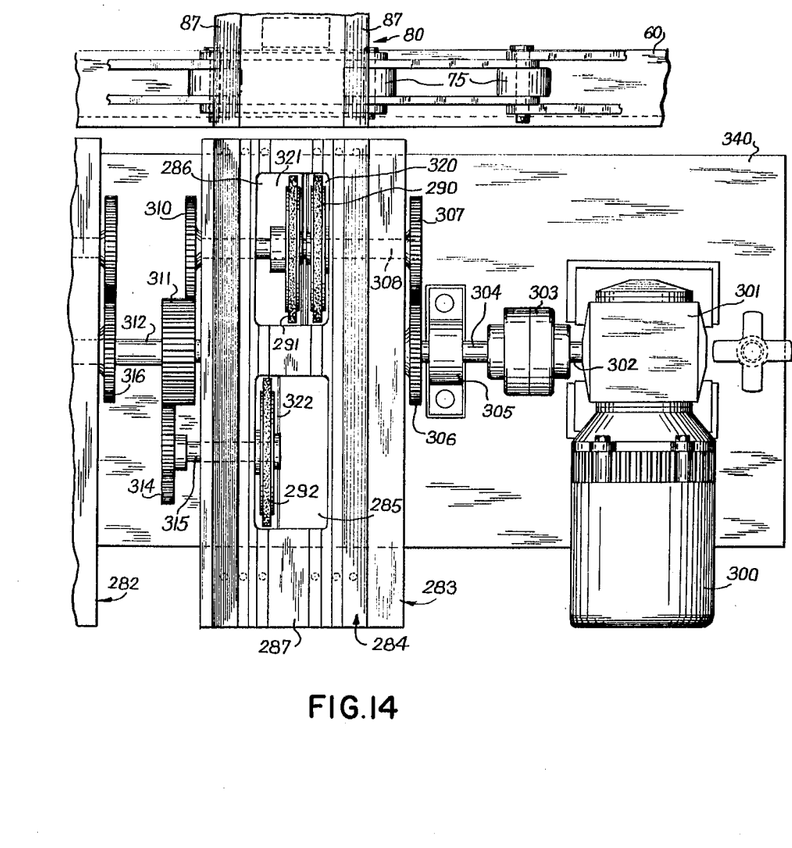
FIG. 14 is an enlarged partial plan view with parts broken away of the machine shown in FIG. 12.

A suitable mechanism is provided for driving the paint rollers and, as best shown in FIG. 13, comprises a motor 300 connected to a speed reduction unit 301 which drives a shaft 302 which is connected by means of coupling 303 to shaft 304. The shaft 304 is suitably supported in a bearing mount 305. Mounted on the shaft 304 is a gear 306. The gear 306 meshes with a gear 307 which is mounted on a shaft 308. The paint rollers 290 and 291 are also mounted on the shaft 308. Thus rotation of the shaft 308 rotates the paint rollers 290 and 291. Gear 310 is mounted on shaft 308 opposite the end on which gear 307 is mounted and meshes with gear 311 mounted on shaft 312. Gear 311 meshes with gear 314 mounted on shaft 315. Paint roller 292 is also mounted on shaft 315. Also mounted on the shaft 312 on which the gear 311 is attached is a gear 316. The gear 316 corresponds with the gear 306 and provides the drive for the paint rollers on the marking means 282 which is adjacent to the marking means 283 just described.

The paint rollers are mounted in such a manner that upon rotation they will pick up paint from suitable reservoir means and apply it to the springs. The reservoir means includes a paint reservoir 320—322 for each paint roller 290—292. The paint reservoirs 320—322 contain paint and the combination of colors of the paints vary for each marking means so that the springs of different grades will be differently marked.

The engagement of the spring with the paint rollers causes a stripe to be placed on the spring. The length of this stripe can be varied by actuation of fluid cylinder 330, which is operably connected to the chute sections 284 of the marking means 280—283. Actuation of the air cylinder 330 associated with a chute section 284 causes the chute section to raise and pivot about pin 331 which rotatably engages lugs 332 which extend from the chute section 284. The raising action, as will be apparent from viewing FIG. 12, will cause the chute section 284 to raise the spring which is being moved across the chute section 284 to an extent that the spring will not engage the paint rollers.

Figure 12:
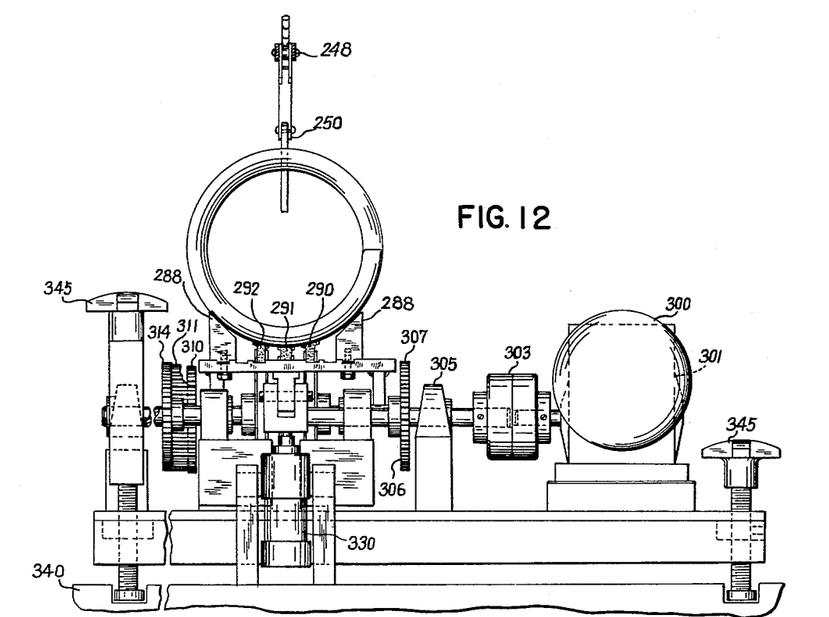
FIG. 12 is a view with parts broken away of the spring treating machine of FIGS. 2 and 3b taken approximately along the line 12—12 of FIG. 2 and FIG. 3b.

The air cylinders 330 are energized when desired by actuation of a switch 333, shown in FIG. 12, which is associated with each of the chute sections 284, and mounted in such a way (not shown) that the spring after a predetermined length of movement on the chute section 284 will engage the switch 333 to actuate the raising of the chute section. The switches 333 may be adjustably mounted so that they may be moved out of position so that the springs will not engage them. Alternatively, the switches 333 may be disconnected from the source of electrical power by the manual depressing of a control button on the control box 22. In fact, any number of arrangements may be utilized for selectively energizing or de-energizing the switches 333 when desired.

The marking means 280—283 associated with each of the discharge chutes is mounted on the discharge chute support frame 340, which in turn is mounted on the intermediate frame 31. A support member 342 supports the marking mechanisms 16 and is adjustably mounted so that it may be raised and lowered with respect to the discharge chute support frame 340. This adjustment is accomplished by means of a plurality of adjusting screws 345 which are threadedly engaged in the support frame 342 of the marking mechanism and bear against the discharge frame 340. When these adjusting screws are rotated it is apparent that they will cause the support frame 342 to be raised or lowered with respect to the discharge frame 340.

As the springs leave the chute sections 284 of the marking means 280—283 they are directed into the inclined discharge chutes. These discharge chutes guide the springs, which slide by gravity down the chutes, into suitable areas where springs of like grade are collected for shipment. By way of example, the springs could be directed into shipping containers or bins from which the springs are taken for shipment. Numerous collecting mechanisms and arrangements could be utilized for this purpose.

*Control Mechanism*

The preferred and illustrated embodiment of the present invention is provided with a means to actuate one of the discharge motors 230—233 in response to the testing mechanism 182 indicating that the spring tested is of a certain grade. As was pointed out hereinabove, the testing mechanism 182 in response to movement of the stem 198 relative to the hermetically sealed container 200 produces a change in the current which flows from the container 200 to the control mechanism 220 through conductor 215. The control mechanism 220 is a conventional control mechanism of the type which includes a motor not shown to rotate shaft 350 through a suitable drive 351. The amount of rotation given to shaft 350 is entirely dependent upon the change in the amount of current received by the motor, which in turn is dependent upon the amount of resistance to compression of the tested spring.

Mounted on the shaft 350 is a dial 360, and a stationary pointer, not shown, is mounted on the casing 361 of the control 220. Rotation of the dial 360 with respect to the pointer will provide a visual indication of the amount of rotation of the shaft 350, and with the dial 360 suitably calibrated the operator can visually read the resistance to compression which the testing mechanism has sensed in the tested spring. Also mounted on the shaft 350 is a plurality of trippers or cam members 370. Each of the cams 370 has a switch 371 associated therewith. The cams 370 are provided with notches 372 which are adapted to receive the control arm 373 of the switches 371. When a notch 372 receives a control arm 373 the corresponding switch is actuated. The control mechanism 220 in a conventional manner will function to indicate the grade of each spring tested and will cause the proper switch 371 for each spring to be actuated.

Actuation of a switch 371 causes one of the double acting cylinders 380, shown on FIG. 3 mounted between legs 61 of the conveyor frame 32, to be energized. Actuation of one of the cylinders 380 causes the piston rod 381 of the actuated cylinder 380 to pivot the rocker tabs 93 which is mounted on flight 80 positioned above the actuated cylinder 380. When a rocker tab 93 is pivoted, it extends into a plane in which the control arms of switches 390—393, shown in FIG. 3a, are located. The pivoted tab 93 will engage the control arm of one of the switches 390—393 to close the switch and complete a circuit for actuating one of the discharge motors 230—233. The tabs 93 which have been pivoted into a switch actuating position are returned to a non-switch actuating position by suitable reset means 398, shown in FIG. 3b, which has a cam surface for engaging the tabs 93 as they are moved past the reset means 93.

The spring which is tested at testing station 14 may be discharged by either of the discharge motors 230—233. If the spring is to be discharged by the motor 230, the switch 390 will be tripped by the rocker arm 393, corresponding to the switch 390. Thus, when the conveyor indexes one station the spring which had previously been tested is located at the discharge chute 18 which corresponds to discharge motor 230 and the rocker tab 93 which had been pivoted actuates switch 390. This causes the motor 230 to be energized and causes the chain 245 to move the flights 250 thereon into engagement with the spring and move the spring through the marking means 280 and down the discharge chute 18a. If the spring is to be discharged at any one of the second, third or fourth stations the operation is similar. More specifically, the rocker tab 93 which corresponds to switches 391, 392 or 393 is pivoted and when the spring is positioned at the proper discharge chute the proper switch 391, 392 or 393 will be energized by the pivoted rocker tab to cause the proper discharge motor to be actuated to move the spring through the associated marking means and down the proper discharge chute.

The various electrical circuits and fluid circuits for the present invention are conventional and one skilled in the art could easily devise suitable circuitry and a suitable fluid system for controlling the various operations described.

While the preferred form of the invention has been described in considerable detail, it will be apparent that the invention is not limited to the construction shown nor the uses referred to and it is my intention to cover hereby all adaptations, modifications and changes which come within the practice of those skilled in the art to which the invention relates and the scope of the appended claims.

Having described my invention, I claim:

1. A method of treating springs comprising providing a conveyor for movably supporting springs, moving said springs on said conveyor through a number of work stations, rotating said springs while on said conveyor at a first one of said work stations to position said springs in predetermined relation, compressing said springs beyond their yield point at a second one of said work stations thus presetting said springs, testing each of said springs at a third one of said work stations to determine its resistance to compression, sorting said tested springs at a fourth one of said work stations into a plurality of grades, and marking the springs of each grade differently than the springs of the other grades at a fifth one of said work stations.

2. A method of treating springs comprising moving said springs through a number of work stations, rotating said springs while at a first one of said work stations to position said springs in predetermined relation, compressing said springs beyond their yield point at a second work station, thus presetting said springs, testing each of said preset springs to determine its resistance to compression, sorting said tested springs into a plurality of grades and marking the springs of each grade differently than the springs of the other grades.

3. A method of treating springs comprising providing a conveyor for movably supporting springs; moving said springs on said conveyor through a number of work stations; rotating said springs while on said conveyor at a first work station to position said springs in predetermined relation; removing said springs from said conveyor, compressing said springs beyond their yield point, and returning said springs to said conveyor at second station, thus presetting said springs; testing said preset springs at a third station to determine their resistance to compression; removing said tested springs having substantially the same resistance to compression from said conveyor at a fourth station; and marking said springs having substantially the same resistance to compression differently than springs having different resistances to compression.

4. A machine for treating springs comprising a conveyor having means for supporting coil springs with their axes extending transverse to the direction of movement of the conveyor, means for moving said conveyor with the springs thereon through a number of different work stations, means for rotating said springs on said conveyor about their axes at a first work station for positioning said springs in a predetermined relation, means independent of said rotating means for compressing said springs beyond their yield point at a second work station, means for testing each of the preset springs to determine its grade as measured by its resistance to compression, a plurality of ejector means equal in number to the number of grades of springs and each operable transverse to the direction of movement of said conveyor for removing springs of only one grade from said conveyor at one point, and means for marking the springs of one grade differently than the springs of the other grades while they are being moved by the ejector means therefor.

5. A machine for treating springs comprising a conveyor having means for supporting coil springs with their axes extending transverse to the direction of movement of the conveyor, means for moving said conveyor with the springs thereon through a number of different work stations, means for compressing said springs axially beyond their yield point at one station, means at another station for testing each of said preset springs to determine its grade dependent upon its resistance to compression, a plurality of ejector means equal in number to the number of grades of springs and each operable transverse to the direction of movement of said conveyor for engaging springs of like grade on said conveyor and for removing the springs of only one grade from said conveyor, and means for marking the springs of each grade differently than the springs of the other grades while the springs are being moved by the ejector means therefor.

6. A machine for treating springs as set forth in claim 5 wherein said means for supporting said coil springs with their axes extending transverse to the direction of movement of said conveyor comprises conveyor flights having a plurality of tabs supported thereon equal in number to the number of said ejector means, separate switch means for controlling actuation of each of said ejector means, means mounting each of said tabs for pivotal movement into a plane containing a given switch means for actuating said given switch means, said switch means being located to be actuated by their respective tab located on one conveyor flight to actuate an ejector means for removing a spring from another conveyor flight in advance of said one conveyor flight.

7. A machine for treating springs as set forth in claim 6 wherein said separate switch means are located at different work stations.

8. A machine for treating springs as set forth in claim 6 further comprising means for pivoting said tabs to position one of the tabs to engage one of said switch means for actuating one of said ejector means, and said means for pivoting said tabs comprises a plurality of switches mounted adjacent a cam shaft in alignment with cams mounted on said cam shaft, said switches being selectively actuated by said cams upon rotation of said shaft, means for selectively rotating said shaft to actuate different ones of said switches in response to testing of each of said springs, and means actuated by said switches for pivoting a respective tab.

9. A machine for treating springs as set forth in claim 5, wherein said means for moving said conveyor is an intermittently actuated drive means for intermittently moving said conveyor to position said springs at each station, and said conveyor includes endless chain means supporting conveyor flights.

10. An apparatus for treating coil springs comprising a conveyor having flights for supporting springs with their axes extending transversely of the direction of the movement of the conveyor, means for intermittently moving said conveyor with said springs thereon from station to station, a plurality of pistons located at successive stations and movable into engagement with the springs on said conveyor, a plurality of reaction members in alignment with said pistons and on the side of said conveyor opposite to the side on which said pistons are located, means mounting said reaction members to resist the compression of said springs by said pistons, means for simultaneously moving said plurality of pistons into engagement with different springs positioned between said pistons and their respective reaction members, means for testing the springs to determine their grade depending upon their resistance to compression, a plurality of chutes located on one side of said conveyor and extending transversely of the direction of movement of said coveyor, a plurality of ejector means in alignment with said chutes and equal in number to the number of grades of springs and each operable transversely to the direction of movement of said conveyor and having means to engage springs of like grade and remove said springs of like grade from said conveyor and slide said springs along the chute aligned with the ejector means therefor, control means in response to said testing means operable to actuate a proper one of said plurality of said ejector means when the tested spring is indexed into alignment therewith by said conveyor to move the spring from the conveyor while said conveyor is at rest between said intermittent movements, and marking means mounted in said chute means to engage said springs and mark said springs of like grade while said springs are being moved by said conveyor means.

References Cited in the file of this patent

UNITED STATES PATENTS

| 2,377,431 | Lakso | June 5, 1945 |
| 2,592,157 | Kendall | Apr. 8, 1952 |
| 2,930,943 | Ruge | Mar. 29, 1960 |
| 3,000,519 | Purnell | Sept. 19, 1961 |

FOREIGN PATENTS

| 772,816 | Great Britain | Apr. 17, 1957 |